US006401849B1

United States Patent
Seguchi et al.

(10) Patent No.: US 6,401,849 B1
(45) Date of Patent: Jun. 11, 2002

(54) DRIVING APPARATUS FOR A VEHICLE

(75) Inventors: Masahiro Seguchi, Obu; Keiichiro Banzai, Toyota, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/762,964

(22) Filed: Dec. 10, 1996

(30) Foreign Application Priority Data

Dec. 15, 1995  (JP) .............................................. 7-327605

(51) Int. Cl.[7] .................................................. B60K 1/02
(52) U.S. Cl. ........................................ 180/65.6; 318/13
(58) Field of Search .............................. 180/65.1, 65.6; 477/3, 7; 475/1, 5; 318/5, 12, 13

(56) References Cited

U.S. PATENT DOCUMENTS 5,562,566 A * 10/1996 Yang ........................... 180/65.6
5,680,908 A * 10/1997 Reed ........................... 180/65.6

FOREIGN PATENT DOCUMENTS

| JP | 60-1069 | 1/1985 |
| JP | 2-133006 | 5/1990 |
| JP | 6-24381 | 3/1994 |
| JP | 7-15805 | 1/1995 |

* cited by examiner

*Primary Examiner*—Richard M Camby
(74) *Attorney, Agent, or Firm*—Pillsbury Madison & Sutro LLP

(57) ABSTRACT

First and second dynamo-electrical machines are provided. A first rotor forming the first dynamo-electrical machine together with a second rotor is connected to either one of a front driving shaft and rear driving shaft. A second rotor forming the second dynamo-electrical machine together with a stator is connected to another one of the front driving shaft and rear driving shaft. As a result, a torque generated by the first dynamo-electric machine is transmitted to either one of the front and rear driving shafts, connected to the first rotor. A torque which subtracts a reaction torque caused by the torque generated by the first dynamo-electric machine from a torque generated by the second dynamo-electric machine is transmitted to another one of the front and rear driving shafts, connected to the second rotor.

10 Claims, 6 Drawing Sheets

DRIVING APPARATUS FOR A VEHICLE

CROSS REFERENCE TO RELATED APPLICATION

This application is based upon and claims the benefit of priority of the prior Japanese Patent Application No. Hei. 7-327605 filed on Dec. 15, 1996, the contents of which are incorporated herein by reference.

BACKGROUND OF THE INVENTION

1. Field of the Invention

The present application relates to a driving apparatus for a vehicle, and more particularly to a driving apparatus capable of driving four wheels of an electric vehicle.

2. Related Arts

When four-wheel driving is attempted to be done in an electric vehicle, it is conceivable that an electric motor is used in substitution for a conventional internal combustion engine. However, in this case, mechanical loss of driving power is large due to a driving power transmission mechanism such as a center differential gear. As a result, loads on the electric motor and a battery become heavy.

To solve this problem, Japanese Patent Laid-Open Publication No. Hei. 2-133006 teaches a driving apparatus in which electric motors are provided on each of four wheels and thereby enable the four wheels to be driven separately.

According to the driving apparatus described above, since each of the four wheels is separately and directly driven by a respective electrical motor, mechanical loss of driving power can be made smaller. However, if a noise signal enters wires connected to the electric motors, driving torques of left and right wheels may lose their balance so that the electric vehicle can not run stably.

SUMMARY OF THE INVENTION

In view of the above problem, the object of the present invention is to provide a driving apparatus for a four-wheel drive vehicle in which a load on an electric motor is lightened by reducing mechanical loss due to a driving power transmission mechanism while maintaining a running stability of the vehicle.

According to the present invention, first and second dynamo-electrical machines are provided in a vehicle. A first rotor forming a part of the first dynamo-electrical machine together with a second rotor is connected to either one of a front driving shaft and rear driving shaft. The second rotor forming a part of the second dynamo-electrical machine together with a stator is connected to another one of the front driving shaft and rear driving shaft.

As a result, a torque generated by the first dynamo-electric machine is transmitted to a driving shaft connected to the first rotor. A torque which is the difference between a reaction torque caused by the torque generated by the first dynamo-electric machine and a torque generated by the second dynamo-electric machine is transmitted to a driving shaft connected to the second rotor. As a result, torques described above are distributed to front wheels and rear wheels.

According to the above-described structure, since a center differential gear is not needed to distribute driving torque, mechanical loss of driving torque can be made small. As a result, loads of the first and second dynamo-electric machines are lightened. Accordingly, since it is not necessary to enhance the performances of the first and second dynamo-electric machines, the size of each of the dynamo-electric machines can be made small. In addition, at least one of the front driving shaft and rear driving shaft is rotated by the first or second dynamo-electric machine. As a result, since left and right front wheels or left and right rear wheels are simultaneously driven at all times, stable running performance of the vehicle can be obtained.

The front driving shaft can be coupled to left and right front wheels via a differential gear. Also, the rear driving shaft can be coupled to left and right rear wheels via a differential gear. As a result, when the vehicle makes a turn, stable running performance of the vehicle can be obtained.

It is preferable that the first rotor and second rotor are connected to the front driving shaft and rear driving shaft, respectively. As a result, since the rear wheels have priority of driving over the front wheels, the vehicle can run more stably.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS (First Embodiment)

Figure 1:
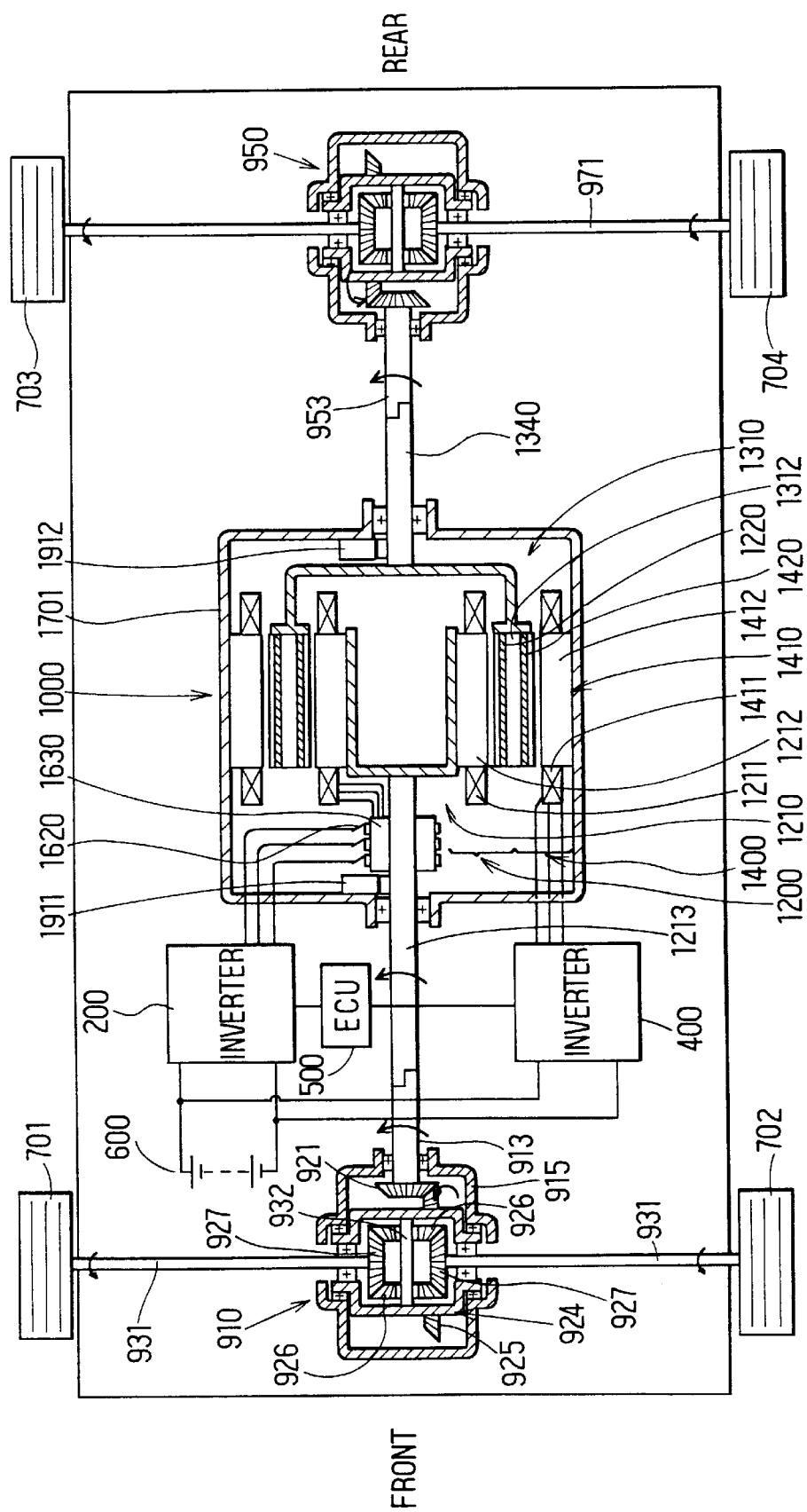
FIG. 1 is a diagrammatic illustration of a driving power transmission mechanism of a four-wheel driving vehicle providing a driving apparatus for the vehicle according to a first preferred embodiment of the present invention.

FIG. 1 is a diagrammatic illustration of a driving power transmission mechanism of a four-wheel drive vehicle providing a driving apparatus for the vehicle according to a first embodiment of the present invention. In FIG. 1, a rotor 1210 of a dynamo-electric machine 1200 is disposed at a center of the inside of a housing 1701 of the driving apparatus 1000. An output shaft 1213 extending from rotor 1210 is connected to a front-wheel driving shaft 913. Front-wheel driving shaft 913 is coupled to acceleration shafts 931 connected to left and right front wheels 701 and 702 via a well-known differential gear apparatus (hereinafter, referred to as a front def. apparatus) 910.

In front def. apparatus 910, a bevel gear 921 is provided on the tip of front-wheel driving shaft 913 which projects into the inside of a housing 915 of front def. apparatus 910. Bevel gear 921 engages a large bevel gear 925 attached to the periphery of a gear box 924. Gear box 924 has a shaft 932 across its inside. Attached to both ends of shaft 932 are bevel gears 926 engaging bevel gears 927 provided on the respective inner tips of acceleration shafts 931.

A rotor 1310 which generates a magnetic field for dynamo-electric machines 1200 and 1400 is disposed around and in concentricity with rotor 1210. Rotor 1310 is connected to an output shaft 1340 joining with a rear-wheel driving shaft 953. Rear-wheel driving shaft 953 is coupled to acceleration shafts 971 connected to left and right rear wheels 703 and 704 via a differential gear apparatus (hereinafter, referred to as a rear def. apparatus) 950 having the same configuration as front def. apparatus 910.

A coil 1211 wound around a core 1212 of rotor 1210 is applied a three-phase alternating current having a predetermined frequency from an inverter 200 via a slip ring 1630 and a brush 1620. A coil 1411 wound around a core 1412 of a stator 1410 has a three-phase alternating current having a predetermined frequency applied thereto from an inverter 400. Direct current electric power is supplied to both inverter 200 and inverter 400 from a battery 600. An ECU 500 controls the operations of inverters 200 and 400.

Figure 2:
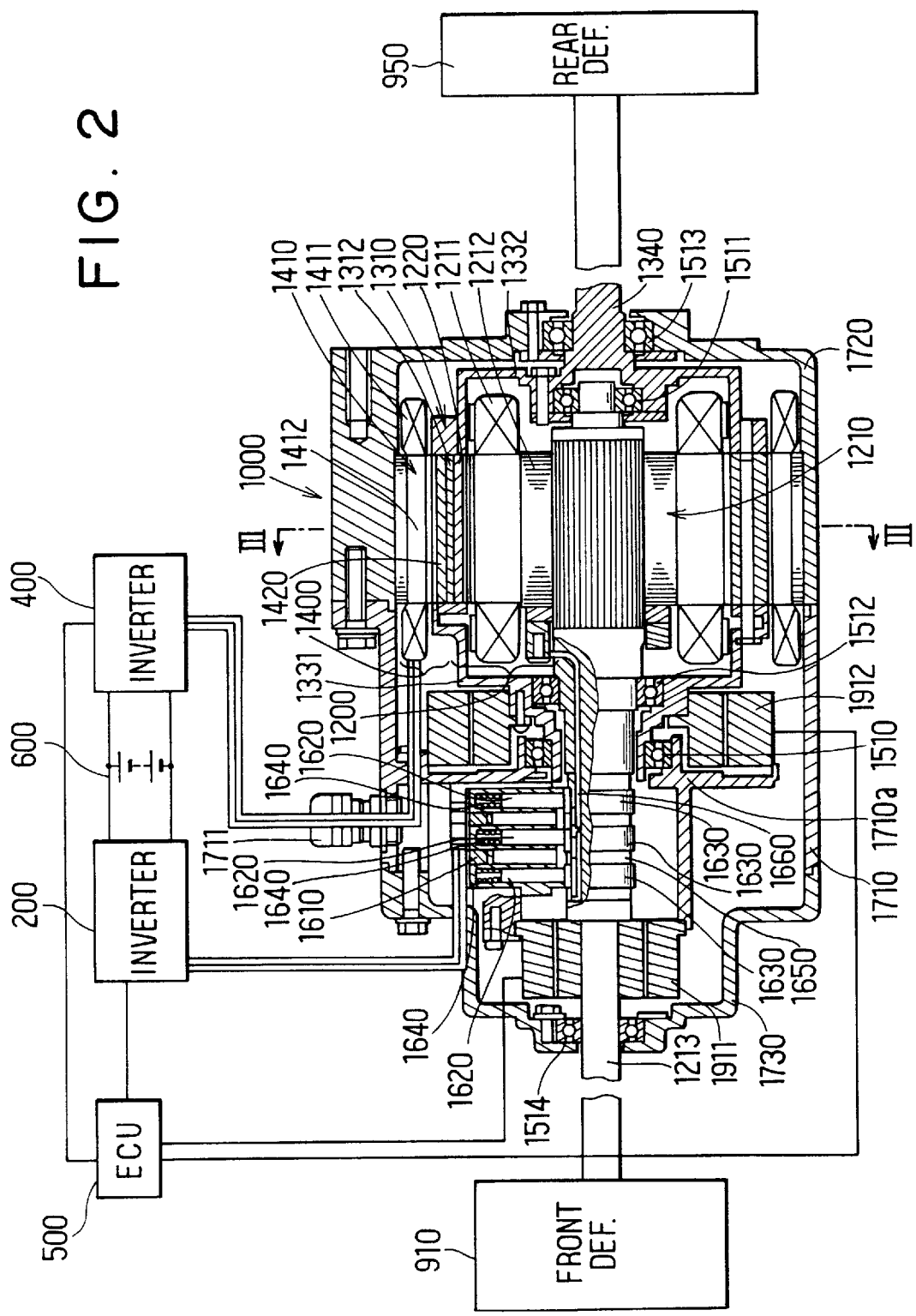
FIG. 2 is longitudinal cross-sectional view of the driving apparatus for the vehicle according to the first embodiment.

FIG. 2 shows a detailed structure of the driving apparatus 1000. Inverter 200 supplies a three-phase alternating current to dynamo-electric machine 1200 by the switching operation thereof. Inverter 400 supplies a three-phase alternating current to dynamo-electric machine 1400 by the switching operation thereof. ECU 500 controls both inverter 200 and inverter 400 based on outputs from rotational angle sensors 1911 and 1912 as well as the other information relating to the state of driving apparatus 1000. Joints or the like (not shown) are provided between driving apparatus 1000 and front def. apparatus 910 or rear def. apparatus 950.

A housing 1701 of driving apparatus 1000 is composed of three housings 1710, 1720 and 1730 joined to each other. Portions at which three housings 1710, 1720 and 1730 are joined to each other are formed into a stepped shape to make the positioning thereof easy and are joined by a plurality of bolts (not shown).

Output shaft 1213 is formed to have a plurality of peripheral portions with several different diameters. Rotor 1210, bearings 1512 and 1514, slip rings 1630 for supplying electric power, rotational angle sensor 1911 and so on are disposed on output shaft 1213. Rotor 1210 includes a coil 1211 for generating a rotating magnetic field and a rotor core 1212. Rotor core 1212 is press-fitted and fixed to a peripheral portion having a maximum diameter in output shaft 1213. output shaft 1213 is formed so that the diameter thereof gradually decreases from the peripheral portion press-fitting rotor core 1212 toward front def. apparatus 910. A bearing 1514 is attached to output shaft 1213 at a portion in the vicinity of front def. apparatus 910. An outer ring of bearing 1514 is fixed to housing 1730. As a result, one end portion of output shaft 1213 is supported by housing 1730 so that output shaft 1213 can freely rotate.

Cylindrical rotor 1310 faces the perimeter of rotor 1210 and is coaxial with rotor 1210 so that rotor 1210 and rotor 1310 can rotate relative to each other. Rotor 1310 includes rotor yoke 1312 and frames 1331 and 1332 supporting the same. Rotor yoke 1312 is sandwiched and fastened between frames 1331 and 1332 and by a plurality of bolts penetrating therethrough.

Output shaft 1340 is formed together with frame 1332. An outer ring of a bering 1513 attached on output shaft 1340 is fixed to housing 1720. Accordingly, output shaft 1340 is supported by housing 1720 to be able to rotate freely. One end portion of output shaft 1340 projects from housing 1720 so that output shaft 1340 is coupled to acceleration shafts 971 connected to rear driving wheels 703 and 704 via rear def. apparatus 950 and so on.

A portion of frame 1332 projects toward rotor 1210. Another end portion of output shaft 1213 is inserted into the projected portion of frame 1332. Since a bearing 1551 is attached to the another end portion of output shaft 1213, output shaft 1213 is supported by frame 1332 to be able to rotate freely.

Coil 1211 is disposed so that its end portion projects further from an end surface of rotor core 1212 in the direction of a rotational axis of rotor 1210. As a result, a space is made inside the end portion of coil 1211 which is ring-shaped and at the side of the end surface of rotor core 1212. The projecting portion of frame 1332 having bearing 1551 inserted therein is disposed in the space. As described above, since the projecting portion receiving bearing 1551 for supporting rotor 1310 does not project toward the outside, a total length of the driving apparatus in the direction of the rotational axis can be made short.

Another frame 1331 supporting rotor yoke 1312 is formed to have a plurality of cylindrical portions with several lengths of diameters. Diameters of the cylindrical portions are reduced step-wisely toward front def. apparatus 910. A cylindrical portion having a minimum diameter in frame 1331 is disposed around a peripheral surface of output shaft 1213 with a minute clearance therebetween. A bearing 1510 is fitted on a peripheral surface of the cylindrical portion having the minimum diameter in frame 1331.

An outer ring of bearing 1510 is fixed to a plate member 1710a extending from housing 1710. Therefore, rotor 1310 can freely rotate due to the fact that frames 1331 and 1332 are supported by housings 1710 and 1720 via bearings 1510 and 1513, respectively. Because respective bearings 1510 and 1513 are coaxial with output shaft 1213, rotor 1310 is also supported to be coaxial with output shaft 1213.

Rotational angle sensor 1912 which is a resolver is located in a space surrounded by frame 1331 and plate member 1710a. A rotational angle of rotor 1310 is detected by rotational angle sensor 1912 by securing one half portion of rotational angle sensor 1912 to frame 1331 and securing the other half portion to plate member 1710a. The output signal sent out from rotational angle sensor 1912 is fed to ECU 500 for rotational control of rotor 1310.

Frame 1331 is supported by output shaft 1213 via a bearing 1512 at a position closer to rotor 1210 than bearing 1510 to rotate freely.

A stator 1410 faces the peripheral surface of cylindrical rotor yoke 1312. Stator 1410 has a stator core 1412 and coil 1411. Stator core 1412 is directly fixed on an inner surface of cylindrical housing 1720. Coil 1411 generates a rotating magnetic field. Stator 1410 is coaxial in the same way that rotor 1210 and rotor 1310 are coaxial to each other.

The inner surface of stator core 1412 is formed to be precisely coaxial with the peripheral surface of rotor yoke 1312 which faces the inner surface of stator core 1412. Also, the inner surface for fixing stator core 1412 and securing surface for securing bearing 1513 of housing 1720 are formed to be precisely coaxial with the rotational axis. wiring from stator 1410 penetrates plate member 1710a extending from housing 1710 to its inside and extends to the outside of housing 1710 through a wiring fixing plug 1711 fixed to the cylindrical portion of housing 1710 to connect with inverter 400.

In rotor 1210, the three-phase leads 1660 extended from the side surface of rotor core 1212 are buried in output shaft 1213 and connected to three slip rings 1630, respectively. Three slip rings 1630 are formed in parallel on the peripheral surface of output shaft 1213. Each of slip rings 1630 is equipped with an insulation member 1650 such as a mold therebetween to assure the insulation with output shaft 1213 and so on.

Brushes 1620 are provided so that their tips contact the respective slip rings 1630. Brushes 1620 are pushed toward slip rings 1630 by springs 1640 disposed behind brushes 1620. Brushes 1620 are held by a brush holder 1610 which is fixed to plate member 1710a of housing 1710. wiring extends from the respective brushes 1620 to inverter 200 to supply electric power from inverter 200 to rotor 1210.

Rotational angle sensor 1911 which is a resolver and detects the rotational angle of rotor 1210 is attached on the peripheral surface of output shaft 1213 between slip rings 1630 and bearing 1514. A fixing portion of rotational angle sensor 1911 is fixed to plate member 1710a projecting from housing 1710. The output signal from rotational angle sensor 1911 is fed to ECU 500 to be utilized for rotational control of rotor 1210.

Figure 3:
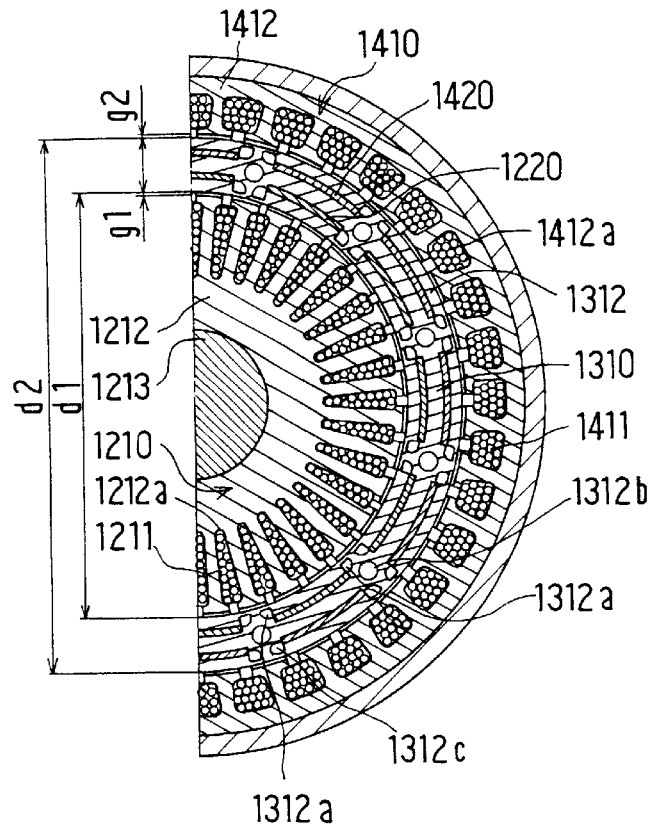
FIG. 3 is a partial transverse cross-sectional view taken on line III—III in FIG. 2.

Structures of rotor 1210, rotor 1310 and stator 1410 will be explained by using the cross-sectional view shown in FIG. 3. Since the structures thereof are bilaterally symmetric, only the right half thereof is illustrated in FIG. 3.

Rotor core 1212 press-fitted around output shaft 1213 has a diameter of d1. A plurality of slots 1212a are formed into a shape extending in the direction of the diameter of rotor core 1212 and along the circumference of rotor core 1212. Coil 1211 is wound through the plurality of slots 1212a. Cylindrical rotor yoke 1312 is disposed to face the peripheral surface of rotor core 1212 with an air gap g1 therebetween. A plurality of magnetic poles 1220 are disposed at uniform intervals in the direction of the circumference of rotor yoke 1312 along the inner circumference thereof. At the both ends of each of magnetic poles 1220, opening holes 1312a are formed to prevent magnetic flux from leaking between the adjacent magnetic poles 1220.

At spaces between the adjacent magnetic poles 1220, bolt holes 1312b through which bolts are inserted to join frames 1331 and 1332 supporting rotor yoke 1312 from its both sides are formed along the circumference of rotor yoke 1312. Bolt holes 1312b penetrate rotor yoke 1312 in the direction of the rotational axis.

Magnetic circuits are formed by magnetic flux flowing between magnetic poles 1220 and rotor core 1212 having coil 1211. Dynamo-electric machine 1200 (shown in FIG. 2) becomes workable due to the magnetic circuits. When the current conducted to coil 1211 is controlled by inverter 200, the rotational torque fed to front def. apparatus 910 is thus adjusted.

A plurality of magnetic poles 1420 formed from only ferromagnetic material are disposed at uniform intervals along the outer circumference of rotor yoke 1312. At both ends of each of magnetic poles 1420, opening holes 1312c are formed to prevent magnetic flux from leaking between the adjacent magnetic poles 1420.

The diameter of the outer circumference of rotor yoke 1312 is a value of d2. A stator 1410 is disposed to face the outer circumference of rotor yoke 1312 with a predetermined air gap g2 therebetween. At an inner circumference side of stator core 1412 of stator 1410, a plurality of slots 1412a are formed to insert coil 1411 thereinto. As a result, magnetic circuits are created by magnetic flux between magnetic poles 1420 of rotor 1310 and stator core 1412 having coil 1411.

When the current conducted through coil 1411 is controlled by inverter 400, the rotational torque fed to rear def. apparatus 950 is thus adjusted. That is, dynamo-electric machine 1400 (shown in FIG. 2) becomes workable due to the magnetic circuits.

The torque distribution of driving apparatus 1000 will be explained in detail. It is assumed that dynamo-electric machine 1400 generates an output of a torque T [Nm] in response to a certain value of the current conducted to coil 1411 and rotational speed n [rpm] in response to the conductance timing of the current. In this case, because stator 1410 is stationary, the torque T acts on rotor 1310 so that the vehicle advances. That is, the torque T acted on rotor 1310 drives rear wheels 703 and 704 via rear def. apparatus 950.

In the situation described above, if a torque t [Nm] acts on rotor 1210 so that front wheels 701 and 702 rotate to cause the vehicle to move forward, a reaction torque −t acts on rotor 1310. Therefore, a total torque acting on rotor 1310 comes to (T−t) [Nm].

In view of the above, when the torque t generated by dynamo-electric apparatus 1200 is controlled by a value of the current conducted to coil 1211 in a range from zero to T, the torque distribution to front and rear wheels 701 to 704 can be adjusted between a ratio of front wheels 1:rear wheels 0 and a ratio of front wheels 0:rear wheels 1.

The current is transmitted from inverter 200 to coil 1211 via brush holder 1610, brushes 1620, slip rings 1630 and leads 1660. The timing at which the current is conducted to coil 1211 is determined based on a relative angle between detection angles detected by rotational angle sensors 1911 and 1912. The torque t is generated at dynamo-electric machine 1200 due to the above current conductance.

Conductance control for dynamo-electric apparatus 1200 will be explained with reference to FIGS. 4 and 5. In conductance control, the output signals from rotational angle sensors 1911 and 1912 are utilized.

Figure 4:
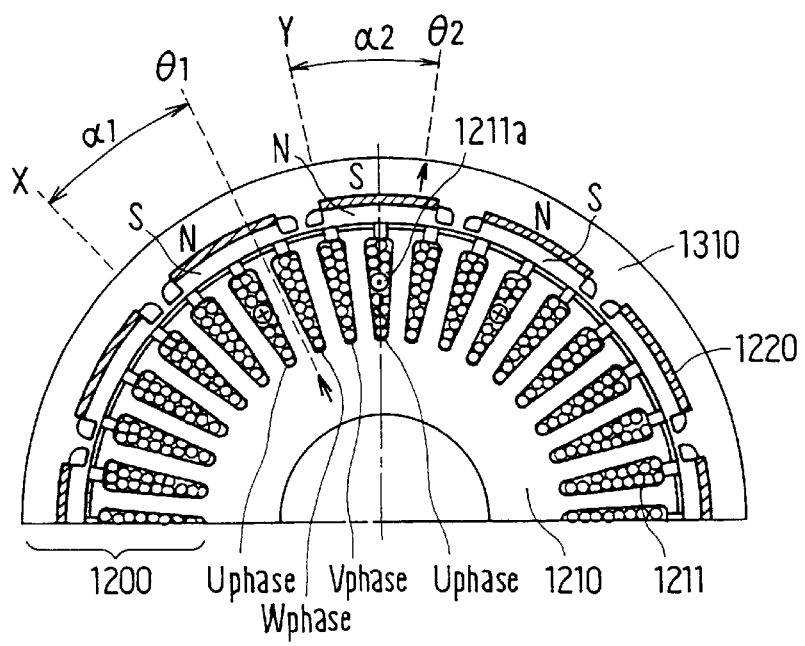
FIG. 4 is a partial transverse cross-sectional view of the driving apparatus for the vehicle for explaining an angle detection principle of a rotational angle sensor.
Figure 5:
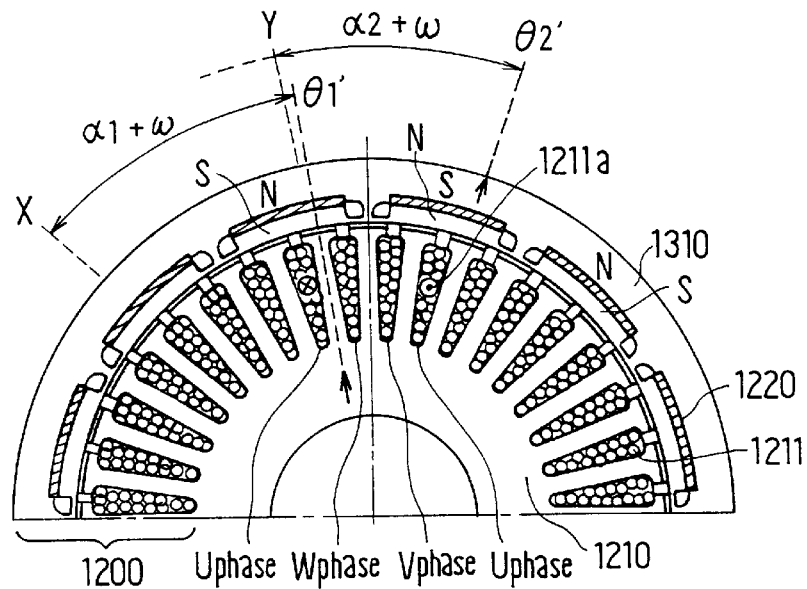
FIG. 5 is a partial transverse cross-sectional view of the driving apparatus for the vehicle for explaining an angle detection principle of a rotational angle sensor.

In FIG. 4, the detection angles $\theta_1$ and $\theta_2$ detected by the respective rotational angle sensors 1911 and 1912 are shown by the following Equations (1) and (2), in a state that an U-phase coil 1211a in which the current flows out of the page faces at the center of the N pole of magnetic pole 1220.

$$\theta_1 = \alpha_1 + (360/P) \times m \quad (0 \leq \alpha_1 < 360/P,\ m = 0, 1, \ldots, P-1) \quad (1)$$

$$\theta_2 = \alpha_2 + (360/P) \times n \quad (0 \leq \alpha_2 < 360/P,\ n = 0, 1, \ldots, P-1) \quad (2)$$

In the above Equations (1) and (2), P represents the number of magnetic poles 1220. Accordingly, 360/P shows a mechanical angle per one magnetic pole 1220. (360/P)×m and (360/P)×n express the respective rotation angles of rotors 1210 and 1310 from angular positions X and Y shown in FIG. 4 at which rotational speed sensors 1911 and 1912 are attached by using angles corresponding to the number of magnetic poles 1220, respectively. α1 and α2 denote displacement angles of rotor 1210 and 1310 within the mechanical angle per one magnetic pole 1220, respectively. The values of $\alpha_1$, $\alpha_2$, $\theta_1$, $\theta_2$ vary in accordance with the rotations of rotors 1210 and 1310. However, as shown in FIG. 5, if rotors 1210 and 1310 rotate by the same angle, the difference of the detection angles detected by rotational angle sensors 1911 and 1912 remain unchanged as shown in the following Equation (3).

$$\theta'_2 - \theta'_1 = [\alpha_2 + \omega + (360/P) \times n] - [\alpha_1 + \omega + (360/P) \times m] \quad (3)$$
$$= (\alpha_2 - \alpha_1) + (360/P) \times k$$
$$= \theta_2 - \theta_1$$
$$k = 0, 1, \ldots, P-1$$

Therefore, when rotor 1210 rotates at the same rotational speed as rotor 1310, a conductance phase angle ($\theta_2-\theta_1$) is constant. Thus, a current $I_U$ shown by the following Equation (4) is fed to coil 1211 of rotor 1210.

$$I_U = I_0 \cos P[(\theta_2-\theta_1)-(\alpha_2-\alpha_1)] \quad (4)$$

As mentioned above, rotational angle θ1 of rotor 1210 and rotational angle θ2 of rotor 1310 against the stationary housing 1710 are detected by rotational speed sensors 1911 and 1912, respectively. A relative rotational angle between rotors 1210 and 1310 is obtained by the difference of the rotational angles (conductance phase angle) ($\theta_2-\theta_1$). The coil current for rotor 1210 can be controlled based on the relative rotational angle.

Even when an angular velocity $\omega_2$ of rotor 1210 is different from an angular velocity $\omega_1$ of rotor 1310 (for example, $\omega_2=\omega_1/2$), the coil current for rotor 1210 can be controlled by the same method as described above. Hereinafter, this will be explained.

Figure 6:
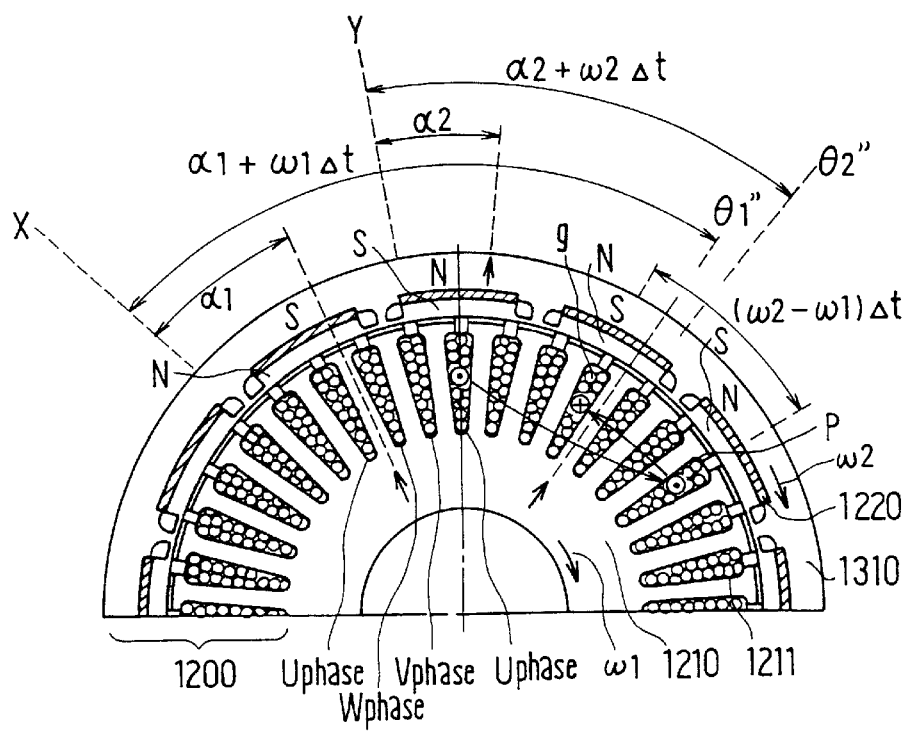
FIG. 6 is a partial transverse cross-sectional view of the driving apparatus for the vehicle for explaining an angle detection principle of a rotational angle sensor.

It is assumed that the rotational positions of rotors 1210 and 1310 reach rotational positions shown in FIG. 6 from rotational positions shown in FIG. 4, respectively, while a time period Δt has passed As obvious from FIG. 6, a relative rotational angle between rotors 1210 and 1310 varies. Therefore, if the coil current I which flows out of the page is fed to the same coil a before, i.e., a coil P, since the direction of the coil current I reverses against magnetic field caused by magnetic pole 1220. As a result, a rotational torque of the same direction as the case shown in FIG. 4 does not act on rotor 1210.

In other words, the coil current I must be conducted to a coil G to cause rotor 1210 to rotate at the same rotational torque as before. Accordingly, coils to be conducted needs to be deviated by a difference of the relative rotational angle ($\omega_2-\omega_1$)Δt between rotors 1210 and 1310.

In this case, a relative rotational angle ($\theta_2''-\theta''$) is expressed by the following Equation (5).

$$\theta''_2 - \theta''_1 = [\alpha_2 + \omega_2 \Delta t + (360/P) \times n] - \quad (5)$$
$$[\alpha_1 + \omega_1 \Delta t + (360/P) \times m]$$
$$= (\alpha_2 - \alpha_1) + (\omega_2 - \omega_1)\Delta t + (360/P) \times k$$

By comparing Equation (3) and equation (5), it is understood that the location of the coil to be conducted varies by the difference of the relative rotational angle ($\omega_2-\omega_1$)Δt. Therefore, also in this case, when the coil current $I_U$ shown in equation (4) in correspondence to the difference ($\theta_2''-\theta''$) of the detection angles $\theta_2''$ and $\theta''$ is fed to coil 1211 of rotor 1210, a desired rotational torque t is generated at dynamo-electric machine 1200.

The function of dynamo-electric machine 1400 is the same as that of a normal electric motor. Rotational angle sensor 1912 detects the rotational angle of rotor 1310 against stator 1410. A conductance timing of the coil current is determined so that rotor 1310 rotates at a desired rotational speed. In addition, a value of the coil current is determined so that a desired torque acts on rotor 1310. Coil current thus determined is supplied from inverter 400 to stator coil 1411.

If dynamo-electric machine has a plurality of magnetic poles, a cross-sectional area of a needed magnetic flux path can be reduced. According to the first embodiment, magnetic poles 1220 and 1440 are divided into a plurality of magnetic poles, respectively, the size of the driving apparatus 1000 can be made small. In addition, magnetic poles 1220 and 1420 are disposed along the inner and outer circumference of rotor 1310, the thickness of rotor 1310 can be made considerably thinner. As a result, even when two dynamo-electric machines 1200 and 1400 are integrated and coaxially disposed, an increase of the size of the diameter of driving apparatus 1000 can be suppressed. As a result the size of driving apparatus 1000 can be made smaller.

In general, the performance (W/kg) of a dynamo-electric machine can be improved by shortening an air gap (g1 and g2 in the first embodiment) in the machine's magnetic circuit and thereby increasing an amount of effective magnetic flux. Therefore, it is preferable that the air gap is shortened as much as possible. However, the length of the air gap must be determined considering an extension of the diameter of a rotor due to a centrifugal forge, a precision in dimension of the respective parts such as a housing and a precision in assembling. In particular, it is necessary that driving apparatus 1000 is designed so that tolerances of the respective parts are not accumulated, whereby the precision in assembling is deteriorated.

With respect to air gap g1, accurate positioning must be done in assembling rotors 1210 and 1310. According to the first embodiment, accurate positioning can be realized by providing bearings 1512 and 1511 therebetween and precisely processing portions, at which bearings 1511 and 1512 are attached, against surfaces (an inner surface of rotor yoke 1312 and an outer surface of rotor core 1212) defining air gap g1.

With respect to air gap g1, accurate positioning can be realized by providing bearings 1510 and 1513 therebetween and precisely processing portions, at which bearings 1511 and 1512 are attached, against surf aces (an outer surface of rotor yoke 1312 and an inner surface of stator core 1412) defining air gap g2. As a result, because air gaps g1 and g2 can be shortened, not only the performances (w/kg) of dynamo-electric machines 1200 and 1400 can be improved but also the size of driving apparatus 1000 can be made further smaller.

(Second Embodiment)

Figure 7:
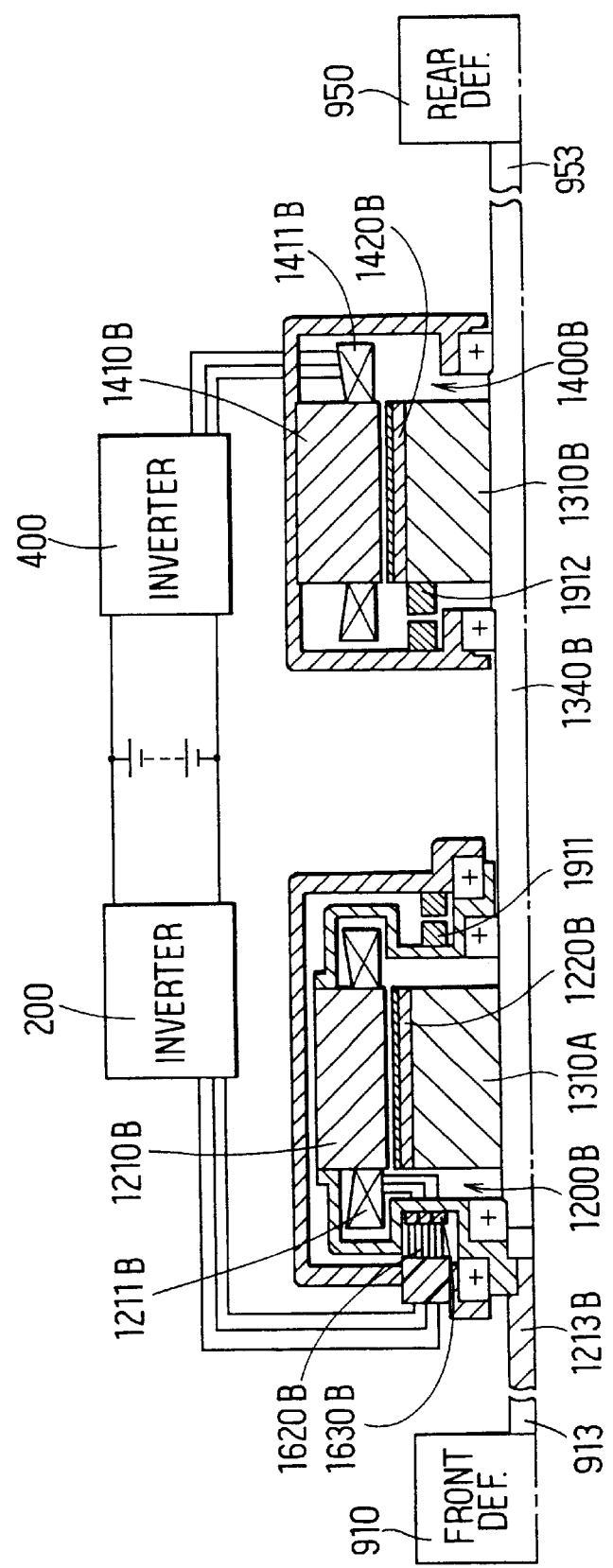
FIG. 7 is a partial diagrammatic illustration of a driving apparatus for the vehicle according to a second preferred embodiment of the present invention.

In FIG. 7, two rotors 1310A and 1310B are separately attached to an output shaft 1340B connected to rear driving shaft 953. A plurality of magnetic poles 1220B are buried on the peripheral surface of rotor 1310A at predetermined intervals. Also, a plurality of magnetic poles 1420B are buried on the peripheral surface of rotor 1310B at predetermined intervals. In a housing containing rotor 1310A, rotor 1210B having coil 1211B is disposed around rotor 1310A. Rotor 1210B is coupled to output shaft 1213B connected to front driving shaft 913 via a frame. An alternating current is supplied from inverter 200 to coil 1211B of rotor 1210B via brushes 1620B and slip rings 1630B.

Stator 1410B having coil 1411B is fixed to an inner wall of a housing containing rotor 1310B to be disposed around rotor 1310B. An alternating current is supplied from inverter 400 to coil 1411B of stator 1410B.

In a driving apparatus configured as above, when a torque T is generated at dynamo-electric machine 1400B formed from stator 1410B and rotor 1310B and a torque t is generated at dynamo-electric machine 1200B formed from rotor 1310A and rotor 1210B, the torque t is applied to output shaft 1213 and the torque (T−t) is distributed to output shaft 1340B .

Therefore, the driving apparatus of the second embodiment can obtain the same result as that of the first embodiment.

(Third embodiment)

Figure 8:
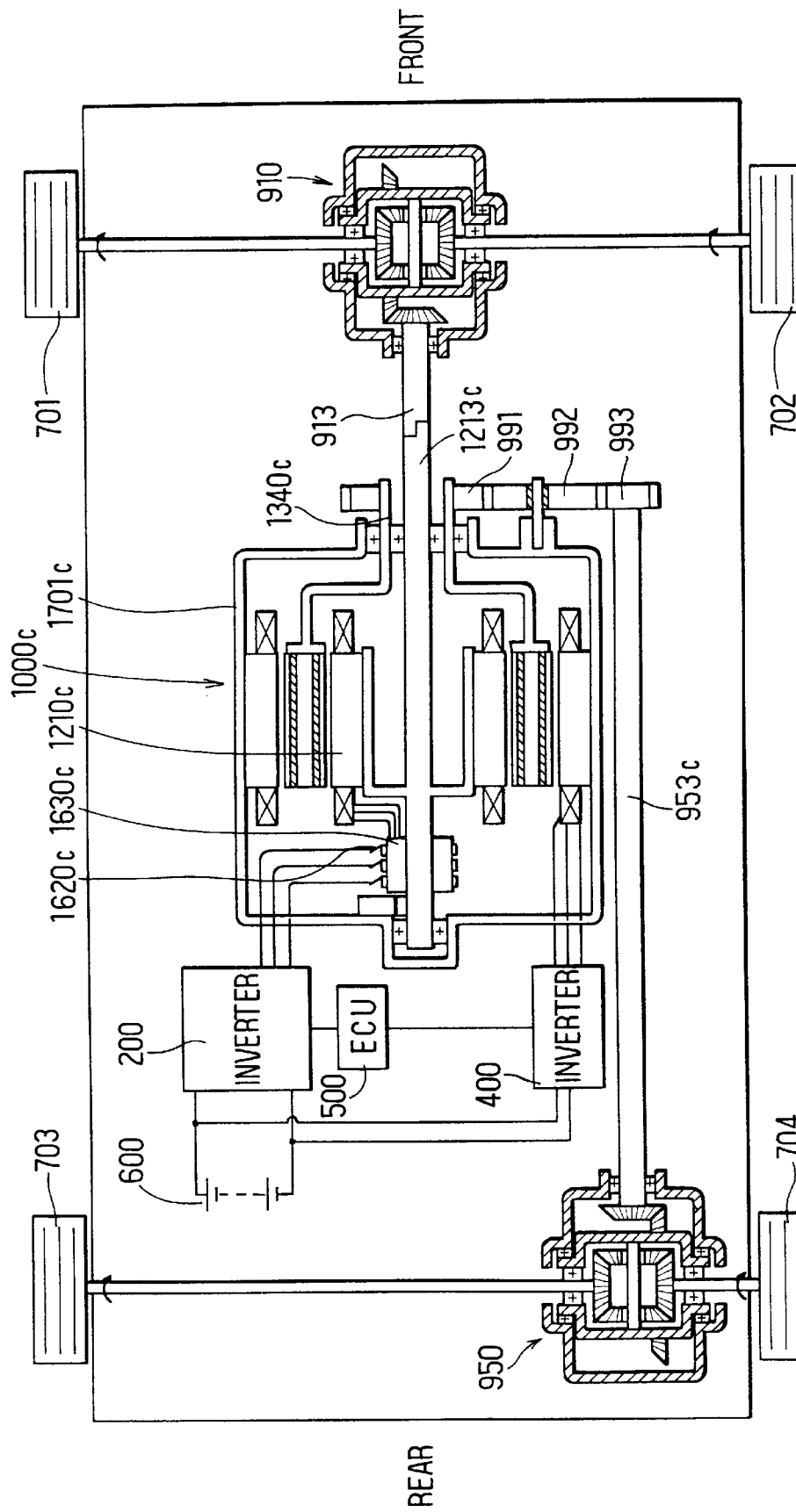
FIG. 8 is a diagrammatic illustration of a driving power transmission mechanism of a four-wheel drive vehicle providing a driving apparatus for the vehicle according to a third preferred embodiment of the present invention.

In FIG. 8, an output shaft 1213C to which rotor 1210C is attached extends from a side wall of a housing 1701C to front driving shaft 913 and is connected therewith. A cylindrical frame 1340C extending from a side surface of rotor 1310C functions as an output shaft. That is, cylindrical frame 1340C projects out of housing 1701C and is located around output shaft 1213C. A gear 991 is attached on the peripheral surface of an end potion of cylindrical frame 1340C. Gear 991 is coupled to a gear 992 rotatably supported on a side wall of housing 1701C. Gear 992 is coupled to a gear 993 which is attached to a front end portion of a rear driving shaft 953C. A rear end portion of rear driving shaft 953C is connected to rear def. apparatus 950.

In the driving apparatus according to the third embodiment, output shaft 1213C and cylindrical frame 1340C are taken out of one side wall of housing 1701C. Accordingly, flexibility of locations with respect to slip rings 1630C, brushes 1620C and wiring to brushes 1620C which are to be located at another side wale of housing 1701C can be improved.

What is claimed is:

1. A driving apparatus for a vehicle comprising:

a housing;

a first rotor including a first coil;

a stator fixed to an inner wall of said housing, said stator including a second coil;

a second rotor in which first magnetic poles are formed at uniform intervals on a surface of said second rotor facing said first rotor to form a first dynamo-electric machine by said first rotor and said first magnetic poles, and second magnetic poles are formed at uniform intervals on a surface of said second rotor facing said stator to form a second dynamo-electric machine by said stator and said second magnetic poles;

a front driving shaft, connected to one of said first and second rotors, for driving front wheels of said vehicle; and a second driving shaft, connected to another one of said first and second rotors, for driving rear wheels of said vehicle.

2. A driving apparatus for a vehicle according to claim 1, wherein said front driving shaft is coupled to left and right ones of said front wheels via a differential gear and said rear driving shaft is coupled to left and right ones of said rear wheels via a differential gear.

3. A driving apparatus for a vehicle according to claim 1, wherein said first rotor is connected to said front driving shaft and said second rotor is connected to said rear driving shaft.

4. A driving apparatus for a vehicle according to claim 1, wherein said first rotor has a first output shaft connected to said one of said front and rear driving shafts and said second rotor has a second output shaft connected to said another one of said front and rear driving shafts, said first and second output shafts being taken out of one side of said housing.

5. A driving apparatus for a vehicle comprising:

a housing;

a first rotor including a first coil;

a stator fixed to an inner wall of said housing, said stator including a second coil and disposed around said first rotor in concentricity with said first rotor with a gap therebetween;

a second rotor disposed between said first rotor and said stator in concentricity therewith, said second rotor having magnetic poles formed at uniform intervals on both its inner circumference surface and outer circumference surface to form a first dynamo-electric machine by said first rotor and said magnetic poles located on said inner circumference surface and to form a second dynamo-electric machine by said stator and said magnetic poles located on said outer circumference surface;

a front driving shaft, connected to one of said first and second rotors, for driving front wheels of said vehicle; and a second driving shaft, connected to another one of said first and second rotors, for driving rear wheels of said vehicle.

6. A driving apparatus for a vehicle according to claim 5, wherein said front driving shaft is coupled to left and right ones of said front wheels via a differential gear and said rear driving shaft is coupled to left and right ones of said rear wheels via a differential gear.

7. A driving apparatus for a vehicle according to claim 5, wherein said first rotor is connected to said front driving shaft and said second rotor is connected to said rear driving shaft.

8. A driving apparatus for a vehicle according to claim 5, wherein said first rotor has a first output shaft connected to said one of said front and rear driving shafts and said second rotor has a second output shaft connected to said another one of said front and rear driving shafts, said first and second output shafts being taken out of one side of said housing.

9. A driving apparatus for a vehicle according to claim 5, wherein said first coil is three-phase coil.

10. A driving apparatus for a vehicle according to claim 9, further comprising:

a first rotational angle sensor for detecting a rotational angle of said first rotor;

a second rotational angle sensor for detecting a rotational angle of said second rotor; and a driving current control device for controlling a driving current provided to said three-phase coil based on a difference between rotational angles detected by said first and second rotational angle sensors.

* * * * *